(12) United States Patent
Vogel et al.

(10) Patent No.: US 8,393,991 B2
(45) Date of Patent: Mar. 12, 2013

(54) AXLE ASSEMBLY WITH A DIFFERENTIAL PROVIDED WITH A DRIVE WHEEL

(75) Inventors: Manfred Vogel, Kappelrodeck (DE); Volker Szentmihalyi, Gutach (DE); Matthias Derse, Elzach (DE)

(73) Assignee: Neumayer Tekfor Holding GmbH, Hausach (DE)

( * ) Notice: Subject to any disclaimer, the term of this patent is extended or adjusted under 35 U.S.C. 154(b) by 0 days.

(21) Appl. No.: 13/029,694

(22) Filed: Feb. 17, 2011

(65) Prior Publication Data

US 2011/0143879 A1 Jun. 16, 2011

Related U.S. Application Data

(60) Division of application No. 12/573,172, filed on Oct. 5, 2009, now Pat. No. 8,221,277, which is a continuation of application No. PCT/DE2008/000576, filed on Apr. 4, 2008.

(30) Foreign Application Priority Data

Apr. 5, 2007 (DE) .......................... 10 2007 016 939
Apr. 4, 2008 (DE) .......................... 10 2008 017 221

(51) Int. Cl.
*F16H 48/06* (2006.01)
(52) U.S. Cl. ...................................... 475/222
(58) Field of Classification Search .................. 475/222, 475/230, 231
See application file for complete search history.

(56) References Cited

U.S. PATENT DOCUMENTS

| | | | |
|---|---|---|---|
| 5,584,777 A | 12/1996 | Sander et al. | |
| 2001/0004611 A1* | 6/2001 | Sahashi et al. | 464/145 |
| 2002/0017155 A1* | 2/2002 | Aota | 74/492 |
| 2003/0144107 A1 | 7/2003 | Orr et al. | |
| 2004/0134307 A1 | 7/2004 | Pascoe et al. | |
| 2005/0164821 A1 | 7/2005 | Santelli | |
| 2006/0229154 A1* | 10/2006 | Kakinami et al. | 475/222 |
| 2006/0240895 A1* | 10/2006 | Yamano et al. | 464/145 |
| 2006/0258501 A1* | 11/2006 | Wormsbaecher | 475/222 |

FOREIGN PATENT DOCUMENTS

| | | |
|---|---|---|
| DE | 83 20 356 U1 | 3/1985 |
| DE | 196 31 937 A1 | 2/1998 |
| DE | 103 04 124 A1 | 9/2003 |
| DE | 102 12 671 A1 | 10/2003 |
| DE | 603 01 784 T2 | 7/2006 |
| DE | 603 05 948 T2 | 10/2006 |
| EP | 1 219 865 A1 | 7/2002 |
| EP | 1 624 229 A | 2/2006 |
| GB | 786593 A | 11/1957 |
| WO | WO 2005/008091 A | 1/2005 |

OTHER PUBLICATIONS

International Search Report dated Feb. 5, 2009 with English translation of relevant pages. Six (6) pages.

* cited by examiner

*Primary Examiner* — David D Le
*Assistant Examiner* — Erin D Bishop
(74) *Attorney, Agent, or Firm* — Crowell & Moring LLP

(57) ABSTRACT

An axle assembly comprising a differential provided with a drive wheel comprising two pairs of bevel gears disposed in a two-part housing, one of the pairs of bevel gears being a pair of axle bevel gears and the other pair of bevel gears being a pair of compensating bevel gears.

4 Claims, 5 Drawing Sheets

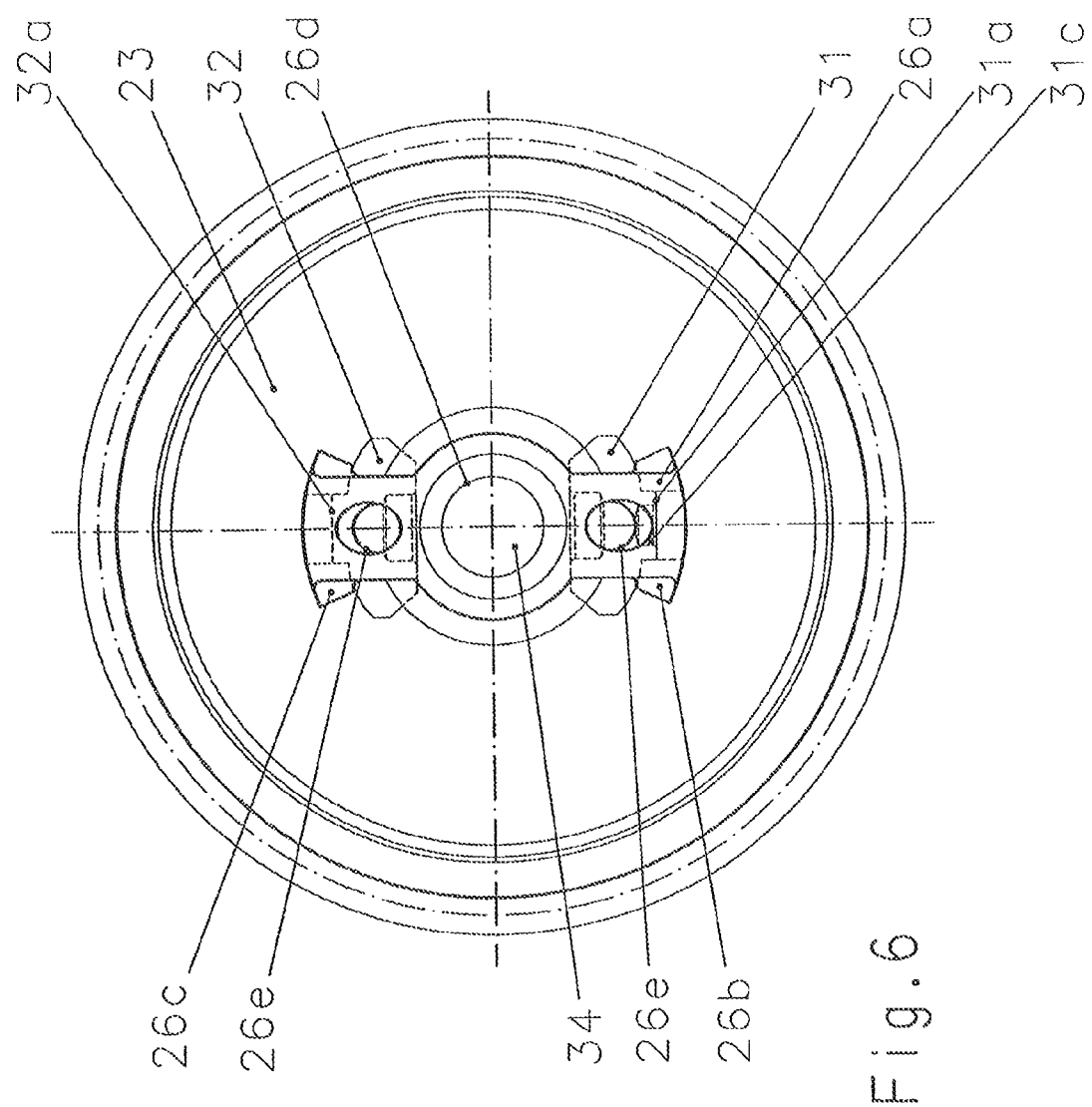

AXLE ASSEMBLY WITH A DIFFERENTIAL PROVIDED WITH A DRIVE WHEEL

CROSS REFERENCE TO RELATED APPLICATIONS

This application is a division of co-pending application Ser. No. 12/573,172, filed Oct. 5, 2009, which is a continuation of international patent application no. PCT/DE2008/000576, filed Apr. 4, 2008 designating the United States of America, and published in German on Oct. 16, 2008 as WO 2008/122276, the entire disclosure of which is incorporated herein by reference. Priority is claimed based on Federal Republic of Germany patent application nos. DE 10 2007 016 939.8, filed Apr. 5, 2007, and DE 10 2008 017 221.9, filed Apr. 4, 2008.

BACKGROUND OF THE INVENTION

Differentials provided with a drive wheel, especially for motor vehicles, have become well-known, for example, from U.S. Pat. No. 6,176,152. Differentials of this type are provided with one pair of differential pinions and one pair of axle bevel gears in a housing formed from two halves or parts, whereby the one housing part also has the flange for the ring gear, which generally is manufactured by forging or by forging and subsequent ring rolling, wherein the metal-cutting and the heat treatment and optionally fine machining of the gearing occurs after the forging. Afterwards, the ring gear is fastened to the flange part, e.g., welded, riveted, screwed or the like.

With respect to the prior art, this US patent specification refers to an embodiment in which the housing and the flange-like fastening area for the ring gear are a one-piece casting. Since this spherical and one-piece differential housing, which is provided with a fastening flange for the ring gear, must be manufactured by casting, it is associated with an expensive metal-cutting in connection with poor accessibility, especially to the interior areas. The assembly of the differential shaft as well as of the differential pinions and axle bevel gears on their axles and into the housing is also extremely difficult, awkward, and expensive. In addition, slide inserts are also provided between the bevel gears and the housing surfaces adjacent to the rear, which increases the aforementioned disadvantages of assembly in view of the narrow space conditions that prevail there and due to the poor accessibility.

In the apparatus of this US patent specification, the housing is constructed as two parts, whereby, however, the two housing parts are each produced by press rollers starting from a round blank, and are subsequently joined together after the chip-forming machining operations. In addition, the ring gear still has to be attached. The attachment of the ring gear results in a high labor cost, particularly since the joint surfaces on both the ring gear and on the fastening area of the flange have to be machined, and with high precision, so that the concentricity and flatness requirements for the overall assembly can be met. In this regard, if tolerances from the machining of the individual parts unfavorably coincide, they can exacerbate the assembly tolerances.

SUMMARY OF THE INVENTION

It is an object of the present invention to provide a differential which is improved in relation to the state of the art.

Another object of the invention is to eliminate the stated tolerances and provide a differential that is inexpensive and simple to manufacture and that distinguishes itself through the possibility of simple machining of the functional surfaces and a reduction in the number of components as well as by easier and low-cost assembly.

Yet another object is to provide a differential of reduced weight and which requires less installation space.

A further object is to provide a differential which facilitates easy connection of drive and output shafts to the differential in order to furthermore create favorable circumstances for direct connection of joints and jointed shafts in order enable the use of joints that are more compact, especially constant velocity joints with an insertable connection instead of a flange connection.

Moreover it is an object of the invention to provide a differential comprising a greater number of preassembled parts.

In a first embodiment of the invention, a differential provided with a drive wheel and comprising pairs of bevel gears accommodated within a multi-part housing, namely one pair of axle bevel gears and one pair of differential pinions or compensating bevel gears which are rotatably mounted in the housing on bearing shafts or pins, one of the housing parts is constructed integrally in one-piece with the flange and the gearing of the drive wheel.

The one-piece construction of the one housing part with the flange of the drive wheel and the gearing first of all reduces the number of individual parts that would otherwise have to be manufactured separately, eliminating the necessary joint surfaces as well as the machining of these surfaces and their assembly.

The two-part construction of the housing leaves the housing open to a simple machining of the functional surfaces inside, the bearing surfaces for the bevel gears and for the sliding parts provided between the bevel gear and bearing surfaces and, optionally, for the machining of the bearing locations for the bevel gear shafts and the receiving bores for the bearing shafts of the compensating bevel gears.

To this end, it is advantageous if the two housing parts are connected to one another by a parting plane or connecting surface joint which is advantageously disposed at least approximately coaxially to the gearing of the drive wheel. For this purpose the parting plane or connecting surface on both of the parts can be divided into an annular centering surface and an axial contact surface.

If according to another aspect of the invention, the one housing part together with the flange and the gearing and/or the other housing part is manufactured by a mass forming process, such as cold forming and/or hot forming, i.e., forging, extrusion or the like, then other advantages arise, namely first a high degree of material utilization, because not insubstantial amount of waste arises when manufacturing the separate ring gear according to the state of the art, e.g., by forging and subsequent ring rolling. In contrast to a two-part construction comprising a housing part having a flange part and a separate ring gear produced by forging and subsequent ring rolling, the present invention also reduces material consumption to the extent that does not produce slugs that are unavoidably produced in forging.

Moreover, in contrast to an embodiment with screwed-on ring gear, for example, it is possible to save material by omitting areas of the ring gear and flange that axially or radially overlap one another. Mass forming furthermore offers the advantage of producing close to final contours, so that the amount of machining required is reduced and the wall thicknesses as a whole can be made smaller, because of both the smaller machining allowance and the greater strength in comparison to castings.

In addition, it is possible to save weight and material by providing recesses in the flange area, whereby it can at least be particularly advantageous in this respect if the drive wheel is constructed with a spoke-like structure, so that only relatively thin, light-weight webs remain between the hub area and the geared area.

Moreover, it may be advantageous to construct the differential such that the housing part that is of integral one-piece construction with the drive wheel having the gearing is the part that has the receiving openings for the bearing shaft or shafts for the compensating bevel gears.

In many applications, however, it may be advantageous if the housing part that is constructed integrally in one-piece with the drive wheel carrying the gearing is not the one that accommodates the bearing shafts of the compensating bevel gears, but instead is the other housing part. Then the housing part with the receiving openings for accommodating bearing shafts of the compensating bevel gears may be the larger housing part, i.e., the differential casing, and the other housing part with the drive wheel may be considered the lid or cover for the differential casing.

In accordance with another embodiment of the invention, it can be advantageous if at least one of the axle bevel gears, and/or in certain embodiments at least one of the compensating bevel gears, is constructed in one piece with its associated bevel gear shaft. Among other things, this has the advantage that no kind of machining, like broaching, gear milling or hobbing, needs to be performed on either the bevel gear or on the connecting area of the pin, in contrast to conventional arrangements in which the bevel gear and pin are separately manufactured parts that must then be assembled to each other.

It can furthermore be advantageous if at least one of the bevel gears has a recess in its end face as viewed in the direction toward the shaft, and/or a recess is provided in the bearing shaft on the side opposite from the end face, so that material and weight can also be saved in this case without impairing strength, whereby the formation of the recess doesn't necessitate any additional shop operations because the recess can be formed in one of the operations which is required anyway.

If the compensating bevel gears and mounting shaft are not constructed in one-piece, then for each of the axle bevel gears it is possible to use an individual mounting shaft, which in particular may be press fit into its corresponding housing half, to mount the differential pinions. This results in easier assembly than in differentials of the state of the art.

If at least one of the compensating bevel gears is constructed in one-piece with its mounting pin, then it may be advantageous to construct this pin or shaft only as a stub or projection, which then has the centering function, but not the mounting function, for the compensating bevel gear and which then also does not need to extend all the way through the corresponding housing part.

Particularly if the axle bevel gear and/or compensating bevel gear is constructed in one piece with its associated shaft, it is possible in a further embodiment to advantageously connect the corresponding drive shafts, such as side shafts, propeller shafts and also power take-off shafts, directly to the bevel gear shaft projecting from the differential housing, and indeed without an expensive flange connection. These types of connections of drive shafts to bevel gear shafts which have splines and project outwardly from the differential can be constructed in a particularly advantageous manner as described and claimed, for example, in the published German patent application nos. DE 10 2006 039 575; DE 10 2004 048 079 and DE 103 44 703, European patent application no. EP 1,519,063 and international patent application nos. WO 98/35174 and WO 2006/037389, and such connections are considered to be within the scope of the present invention.

An additional solution of the object that forms the basis of the present invention results from an axle assembly for motor vehicles, for use either between two gears (one gear and e.g., one differential or e.g., between one transfer gearbox and one differential, the latter in particular for a driven front axle) or else between a gear and a wheel to be driven, comprising a differential, especially such a differential in which at least one of the axle bevel gears thereof is embodied one-piece with its associated bevel gear pin, in which the joint inner part of a constant velocity rotary joint can be fastened to the side of the axle assembly opposite to the axle bevel gear by means of a connection like a spline, and wherein the drive shaft of the axle assembly can be fastened to the joint outer part, and wherein there is provided, between the axle bevel gear and the other gear or the wheel to be driven, at least one unit that allows longitudinal displacement. To this end, this unit that allows longitudinal displacement can particularly favorably be a constant velocity rotary joint which also allows axial displacement.

For this, especially if the axle bevel gear is one-piece with the bevel gear pin, the end of the bevel gear pin or pins facing the corresponding drive shaft can have a profile, like a longitudinal gearing, which serves to accommodate an inner joint part of a constant velocity rotary joint, a drive shaft being connected to the joint outer part thereof.

Another advantageous embodiment results if the differential carrier is provided with recesses, again resulting in weight and cost savings.

The aforementioned joint between the differential carrier and the other housing part is preferably provided outside the radial supporting area for the differential pinions. This ensures low wear, because the bevel gears do not then have to slide over any joints.

Another solution is formed when the differential carrier is embodied bow-shaped and then contains only the receiving openings or bearing positions for the bearing bolts, bearing pins or bearing shafts of the differential pinions and one of the bearing pins of one of the bevel gears. This represents the optimum form of possible material savings, which however can be even further improved by reliefs in the bows, depending on the firmness requirements.

BRIEF DESCRIPTION OF THE DRAWINGS

The invention will be described in further detail hereinafter with reference to illustrative preferred embodiments shown in the accompanying drawing figures, in which:

FIG. 6 shows a sectional view taken along line A-A of FIG. 5.

DETAILED DESCRIPTION OF ILLUSTRATIVE EMBODIMENTS

Figure 1:
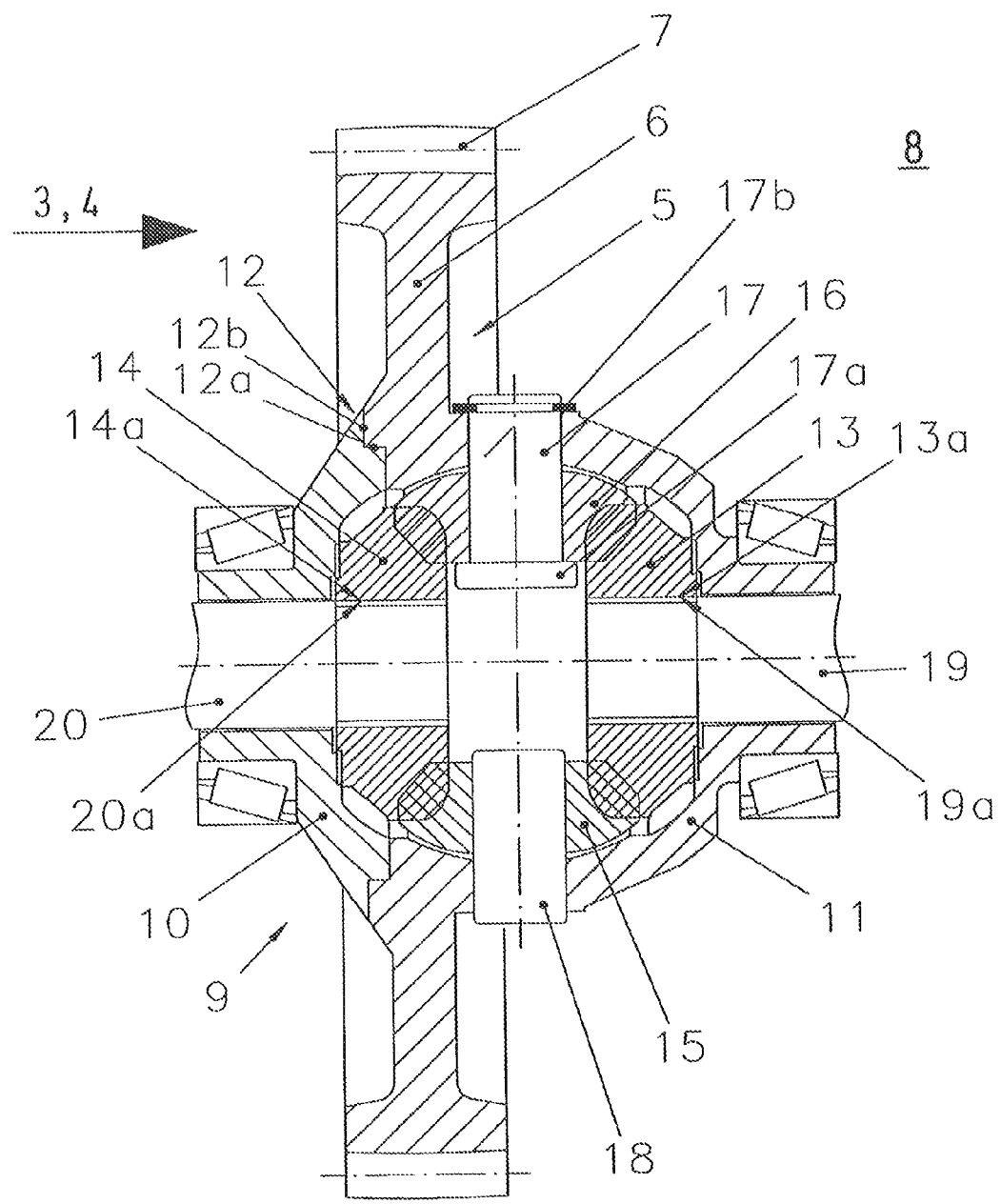
FIG. 1 shows a longitudinal sectional view of an embodiment of the differential according to the invention.

FIG. 1 shows the differential 8 provided with a drive wheel 5 provided with a gearing 7 on a flange area 6 of the drive wheel 5. In this case, a housing 9 comprises 2 housing halves 10, 11, which are joined together by a butt joint 12. This butt joint has a centering surface 12a for each housing part, and a stop face 12b is formed on each of the two housing parts. The housing 9 contains a pair of axle bevel gears 13, 14 and a pair of differential pinions 15, 16. The differential pinions 15, 16 are each rotatably mounted on a bearing bolt 17, 18. In this embodiment, the bearing bolt 18 is secured in the housing part 11 by a press fit. The bolt 17 has a collar 17a and is secured by a retaining ring 17b.

The axle bevel gears 13, 14 are accommodated on a counter-gear 19a, 20a of the bevel gear pins 19, 20 using a spline 13a, 14a. In the example of the present embodiment, the differential pinions 15, 16 are accommodated within that housing part 11 which also has the integrally formed flange 6. The gearing 7 is produced one-piece with the flange and is indeed produced together with the flange part and the housing part 11 by mass forming and subsequent metal-cutting. The housing part 11 represents the differential carrier in this case.

After the differential bolts 17, 18, the differential pinions 15, 16 and the axle bevel gears 13, 14 (with or without preassembled bevel gear pins 19, 20) have been assembled, the housing part 11 is closed by attaching the housing part 10, which is designed as a lid. The housing parts 10 and 11 are then advantageously welded.

Figure 2:
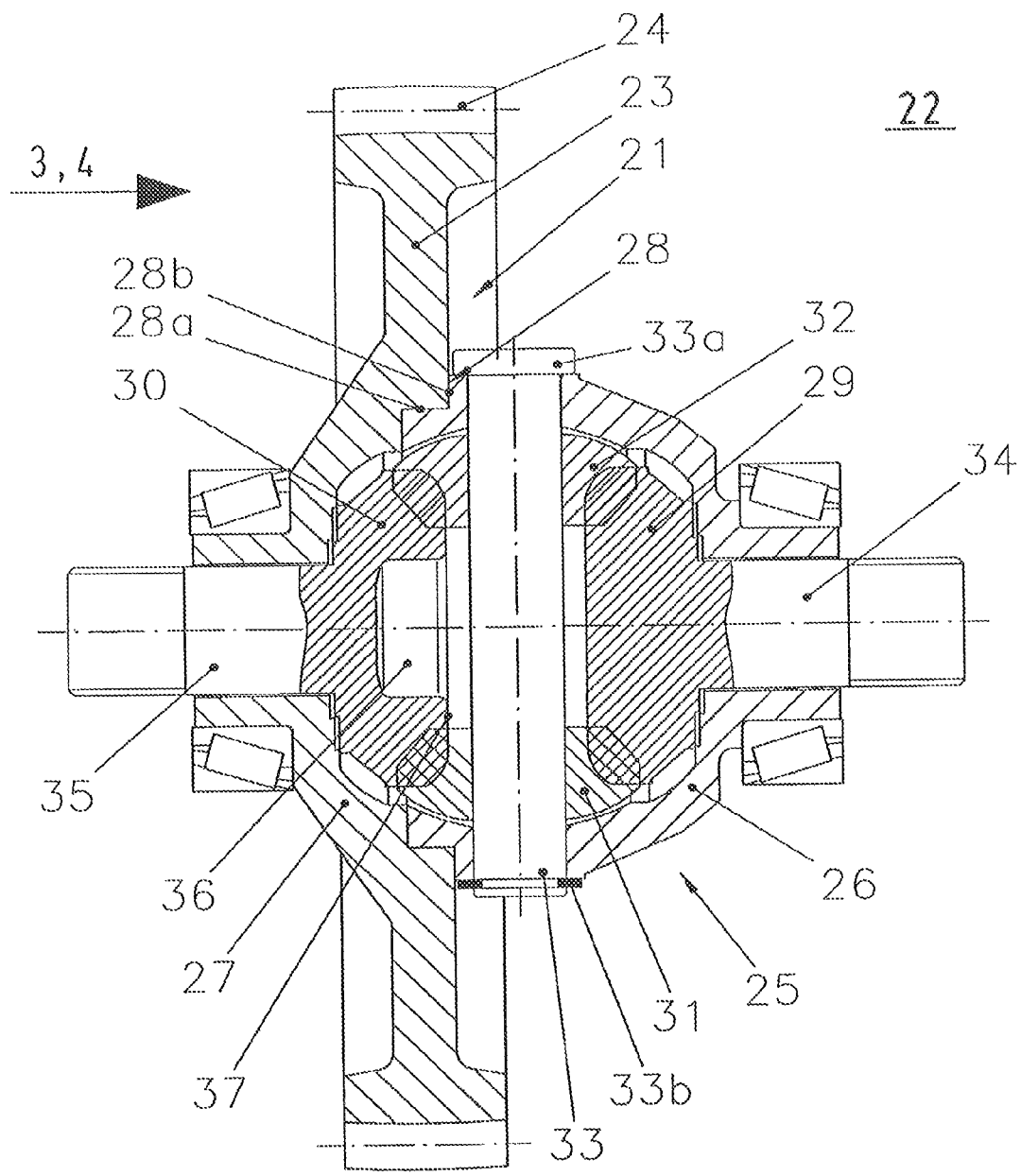
FIG. 2 shows another variant embodiment of the differential of the invention.

The drive wheel 21 of the differential 22 with its flange area 23 and the gearing 24, which is likewise formed one-piece, is again visible in FIG. 2. The housing 25 likewise comprises 2 housing halves 26 and 27, which are again joined together by the butt joint 28, which can be welded. The housing 25 contains the two axle bevel gears 29, 30 and the two differential pinions 31, 32. In this case the differential pinions 31, 32 are mounted on a differential bolt 33 that passes through.

In this illustrative embodiment, two bearing bolts 17, 18 are provided for the differential pinions 15, 16, in contrast to the currently conventional embodiments which use one differential bolt that passes through. The separately configured bolts provide better mountability and save weight.

In the illustrative embodiment of FIG. 2, the housing part 27, which has the flange and the gearing, is constructed to a certain extent as the lid for the other housing part, the differential carrier 26. In this case, the axle bevel gears 29, 30 are integrally embodied one-piece with their bearing pins 34, 35, namely by mass forming. Based on the axle bevel gears 30, a possibility of saving further weight is indicated in that a recess 36 proceeding from the face 37 has been introduced. The butt joint 28 again consists of the bearing surfaces labeled 28b and the centering surfaces labeled 28a. Here the bolt 33 is embodied to pass through and is secured by a collar 33a and a retaining ring 33b.

Figure 3:
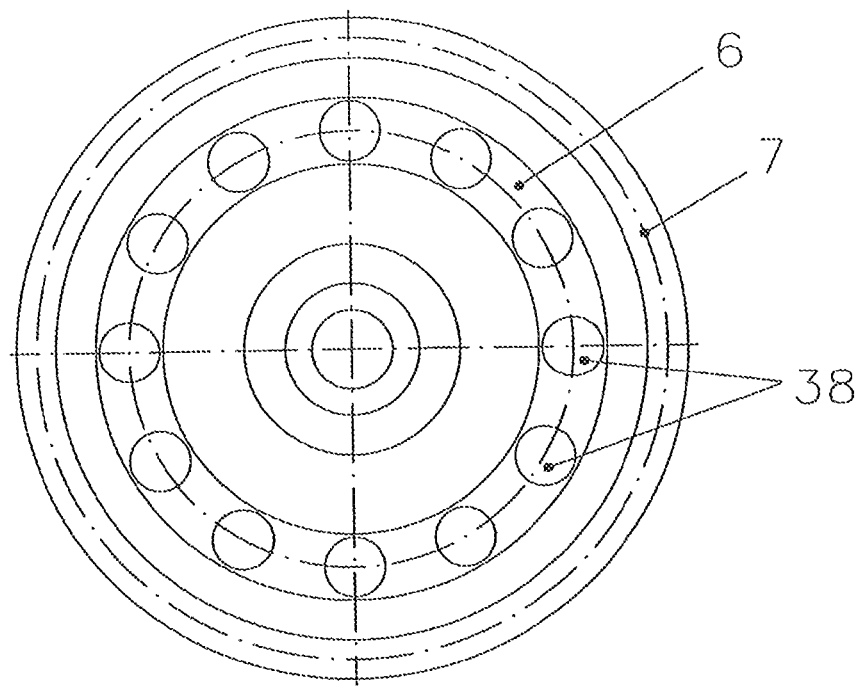
FIGS. 3 and 4 each show a view in the direction of arrow 3 or 4 of FIG. 1 or FIG. 2, respectively.

The flange area 6 and the geared area 7 formed thereon can be seen in FIG. 3. The flange area 6 is interrupted by recesses 38, which can be introduced by perforating during the forming operation and thus save weight.

Figure 4:
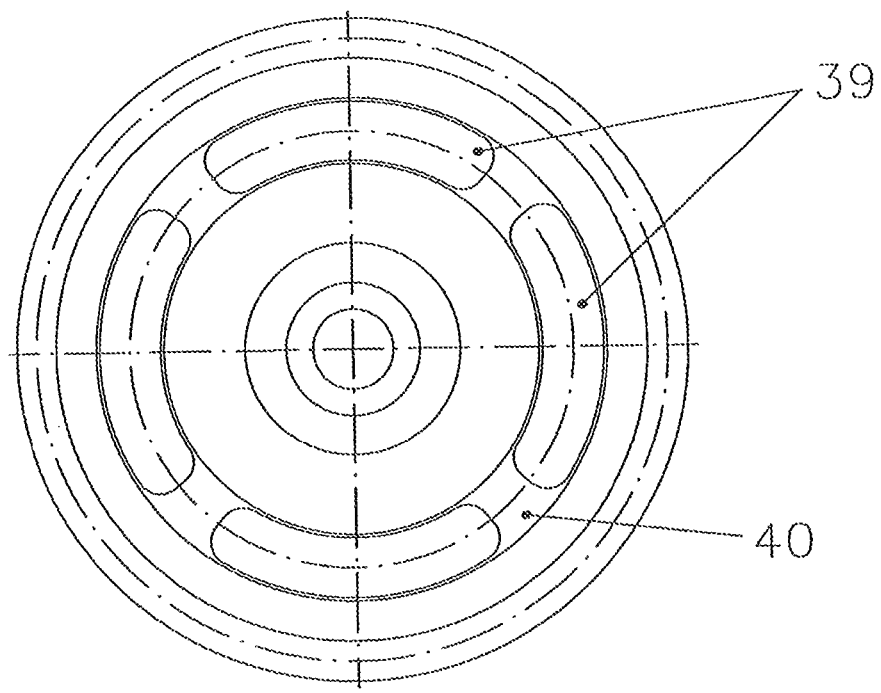

In FIG. 4, the recesses 39 in the flange area are enlarged and only several relatively narrow webs or spokes 40 remain.

It can be seen that in the embodiments according to the present invention, the number of single parts required has been reduced in comparison with the prior art and the accessibility of the interior area for machining and assembly has been considerably improved. The assembly of the plastic lubricant to be introduced between the differential pinions and axle bevel gears and the facing housing surfaces is also facilitated. Moreover the elimination of the centering surfaces between the ring gear and flange reduces the number of machining operations. Material input is reduced because axially or radially overlapping areas of the flange and of the ring gear are not necessary. Moreover the precision, i.e., concentricity and flatness, are improved and weight is spared.

The connection of drive shafts, like side shafts, can be performed in a particularly favorable manner by appropriately embodying the pins 34, 35 in correspondence with the patent applications mentioned in the general description.

Figure 5:
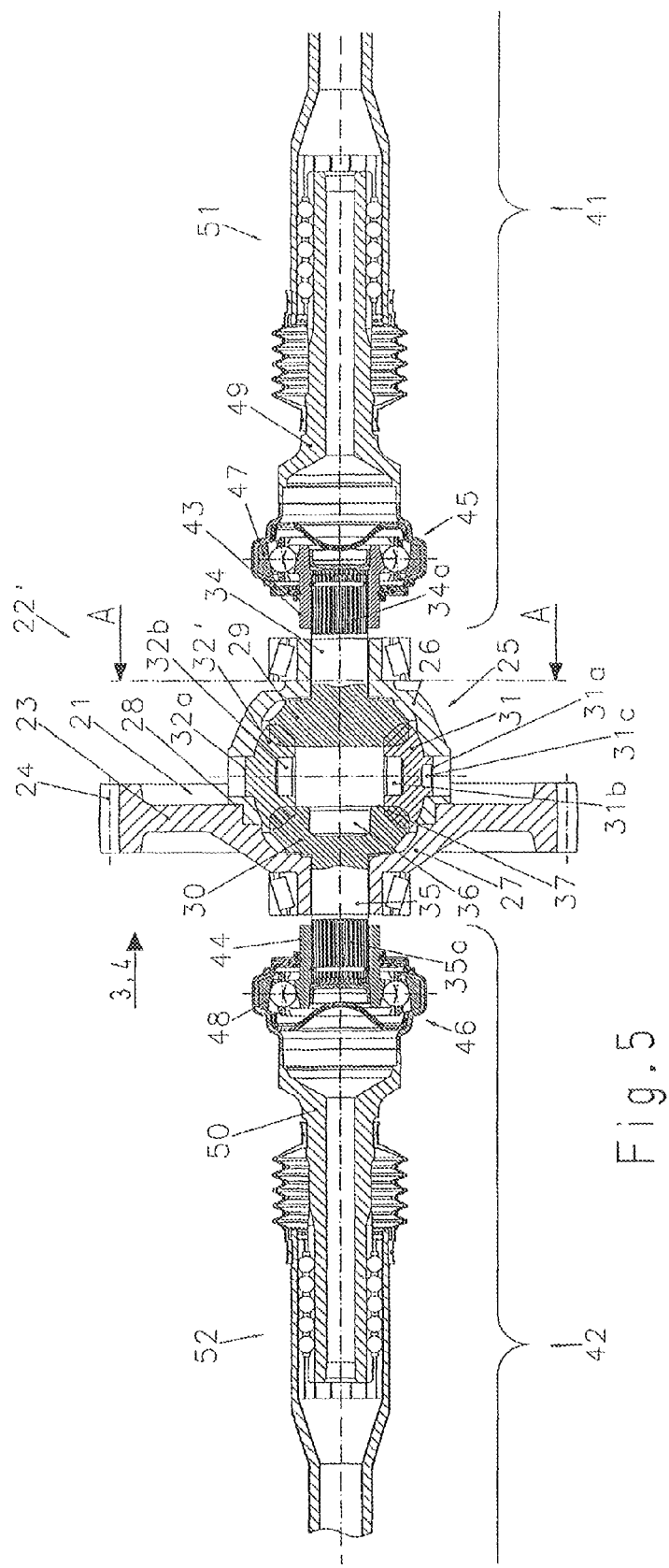
FIG. 5 shows a partial view of an axle assembly with a differential according to the present invention.

FIG. 5 shows a partially illustrated drive assembly comprising a differential 22' and partially illustrated drive shafts 41, 42 connected thereto. The basic construction of the differential 22' corresponds to that of FIG. 2, for which reason identical components have been provided with the same reference characters. The axle bevel gears 29, 30 with their integrally formed axle ends 35 and 34 can be recognized and the housing parts 26 and 27.

The differential pinions 31' and 32' each have an integrally formed bearing pin 31a and 32a, which in this case is embodied as a stub, resulting in easier mountability. These stubs essentially serve for centering the differential pinions. The differential pinions are each provided with a recess 31b, 32b, thereby saving weight. The side of the differential pinions 34, 35 facing away from the bevel gearing each have a spline 34a, 35a by means of which the inner hubs 43, 44 of constant velocity fixed ball joints 45, 46 are arranged in non-rotatable fashion. The retaining rings or snap rings shown here serve to achieve the axial fixation.

The two drive shaft parts 49, 50 are linked to the joint outer parts 47, 48 by beads. The drive shaft parts 49, 50 are connected to other parts of the drive shafts 51, 52 by a ball displacement unit and lead to the drive wheels through another constant velocity joint, which is not shown here.

The differentials according to the invention can also be used for rear-wheel drives and also for one-piece and multi-piece propeller shafts or cardan shafts or power take-off shafts.

FIG. 6 shows another embodiment possibility of the housing half 11, which is also called differential carrier and has been illustrated bell-shaped or basket-like in the earlier figures. This housing part 26a is configured bow-shaped or U-shaped in FIG. 6 and bears the bearing pins 31a, 32a of the differential pinions 31, 32 on its U-shaped ends 26b, 26c, said bearing pins 31a, 32a being provided in bearing recesses. A recess 26d serves as bearing seat for the bevel gear pin 34. The legs of the U-shaped "differential carrier" are tightly connected, e.g., welded, to the pinion gear drive 23 by the butt joints 28 of FIG. 5, which are not illustrated here. It is furthermore possible to save weight by introducing recesses 31c in the bearing pins 31a, 32a as in FIG. 5. The openings indicated by 26e demonstrate one possibility for saving weight. But the types of openings corresponding to FIGS. 4 and 5 can also be provided in the differential carriers 11 and 26 of FIGS. 1 and 2.

The foregoing description and examples have be set forth merely to illustrate the invention and are not intended to be limiting. Other advantageous embodiments may be constructed by combining together various features described above and/or illustrated in the drawings and/or described in the documents cited above, which are incorporated herein by reference. Since modifications of the described embodiments incorporating the spirit and substance of the invention may occur to persons skilled in the art, the invention should be construed broadly to include all variations within the scope of the appended claims and equivalents thereof.

The invention claimed is:

1. An axle assembly for a motor vehicle comprising:
a differential,
a first and a second constant velocity joint,
a first and a second ball displacement unit,
a first and a second drive shaft,
wherein the differential comprises a first and a second axle bevel gear, said first axle bevel gear being constructed integrally in one piece with a first bearing shaft, and said second axle bevel gear being constructed integrally in one piece with a second bearing shaft, said first bearing shaft has a profile configured to accommodate a joint inner part of said first constant velocity joint, said second bearing shaft has a profile configured to accommodate a joint inner part of said second constant velocity joint, said first bearing shaft being connected to said first drive shaft, said first bearing shaft being directly in contact with said joint inner part of said first constant velocity joint, said second bearing shaft being connected to, and in a direction toward, said second drive shaft, said second bearing shaft being directly in contact with said joint inner part of said second constant velocity joint, in a direction toward the first drive shaft said joint inner part of said first constant velocity joint is directly followed by a joint outer part of said first constant velocity joint, in a direction toward the second drive shaft said joint inner part of said second constant velocity joint is directly followed by a joint outer part of said second constant velocity joint, in the direction toward said first drive shaft said joint outer part of said first constant velocity joint is directly followed by an inner part of said first ball displacement unit, in the direction toward said second drive shaft said joint outer part of said second constant velocity joint is directly followed by an inner part of said second ball displacement unit, in the direction toward said first drive shaft said inner part of said first ball displacement unit is directly followed by an outer part of said first ball displacement unit, in the direction toward said second drive shaft said inner part of said second ball displacement unit is directly followed by an outer part of said second ball displacement unit, in the direction toward said first drive shaft said outer part of said first ball displacement unit is directly followed by said first drive shaft, and in the direction toward said second drive shaft said outer part of said second ball displacement unit is directly followed by said second drive shaft.

2. The axle assembly according to claim 1, wherein said first bearing shaft is connected via a spline with said joint inner part of said first constant velocity joint, said second bearing shaft is connected via a spline with said joint inner part of said second constant velocity joint, said joint inner part of said first constant velocity joint being axially fixed to said first bearing shaft by either a first retaining ring or a first snap ring, and said joint inner part of said second constant velocity joint being axially fixed to said second bearing shaft by either a second retaining ring or a second snap ring.

3. The axle assembly according to claim 1, wherein said joint outer part of said first constant velocity joint is connected to said inner part of said first ball displacement joint via a first crimp or a first bead, and said joint outer part of said second constant velocity joint is connected to said inner part of said second ball displacement joint via a second crimp or a second bead.

4. The axle assembly of claim 1, wherein said first bearing shaft is located partially within said joint inner part of said first constant velocity joint, and said second bearing shaft is located partially within said joint inner part of said second constant velocity joint.

* * * * *